(12) United States Patent
Zierden

(10) Patent No.: US 11,958,398 B1
(45) Date of Patent: Apr. 16, 2024

(54) APPARATUS FOR MOVING OBJECTS SUCH AS SMALL RECREATIONAL VEHICLES

(71) Applicant: Daniel Zierden, Fergus Falls, MN (US)

(72) Inventor: Daniel Zierden, Fergus Falls, MN (US)

( * ) Notice: Subject to any disclaimer, the term of this patent is extended or adjusted under 35 U.S.C. 154(b) by 600 days.

(21) Appl. No.: 17/168,680

(22) Filed: Feb. 5, 2021

(51) Int. Cl.
*B60P 3/06* (2006.01)
*B62B 3/02* (2006.01)

(52) U.S. Cl.
CPC . *B60P 3/06* (2013.01); *B62B 3/02* (2013.01)

(58) Field of Classification Search
CPC . B60P 3/062; B60P 3/06; B62B 3/008; B62B 5/0083; B62B 3/10; B62B 2202/90
See application file for complete search history.

(56) References Cited

U.S. PATENT DOCUMENTS

| | | | |
|---|---|---|---|
| 3,860,078 A | 1/1975 | Stoick | |
| 3,897,959 A | 8/1975 | Haffner | |
| 4,274,644 A * | 6/1981 | Taylor | B62B 3/02 280/43.13 |
| 4,288,087 A | 9/1981 | Morrison | |
| 4,637,626 A * | 1/1987 | Foss | A45C 13/385 280/655 |
| 4,765,643 A * | 8/1988 | Pappanikolaou | B62B 3/02 D34/12 |
| 5,028,060 A * | 7/1991 | Martin | B62B 3/02 280/30 |
| 5,441,378 A | 8/1995 | Puls | |
| 5,449,184 A | 9/1995 | Knobloch | |
| 5,474,416 A * | 12/1995 | Rogge | B62D 63/061 414/495 |
| 5,632,498 A | 5/1997 | Beaudet | |
| 6,102,369 A | 8/2000 | Monger | |
| 6,206,386 B1 | 3/2001 | Briggs | |
| 6,832,769 B2 | 12/2004 | Savage | |
| 6,869,087 B2 | 3/2005 | Veeser | |
| 6,893,030 B2 * | 5/2005 | Shapiro | B62B 7/10 280/651 |
| 8,876,140 B2 * | 11/2014 | Barnett | B60P 3/122 280/401 |
| 9,321,388 B2 * | 4/2016 | Barnett | B60P 3/122 |
| 10,981,588 B1 * | 4/2021 | Poudrier | B62B 3/02 |
| 2001/0033071 A1 | 10/2001 | Krumwiede | |
| 2004/0245733 A1 * | 12/2004 | Abel | B62B 3/12 280/39 |
| 2006/0245873 A1 | 11/2006 | Black | |
| 2016/0052534 A1 * | 2/2016 | Henao | B62B 5/067 280/659 |

* cited by examiner

*Primary Examiner* — Kevin Hurley
*Assistant Examiner* — Hosam Shabara
(74) *Attorney, Agent, or Firm* — Jeffrey A. Proehl; Woods, Fuller, Shultz & Smith, PC

(57) ABSTRACT

An apparatus for moving an object across a ground surface may include a platform having an upper surface for positioning the object on, and a perimeter. The apparatus may also include a plurality of lift assemblies configured to selectively raise the platform off of the ground surface and permit the apparatus to move across the ground surface with the object carried on the platform. The plurality of lift assemblies may be located along the perimeter of the platform, and each of the lift assemblies may have a deployed condition and a retracted condition. The deployed condition may be characterized by the lift assembly facilitating movement of the platform across the ground surface.

20 Claims, 6 Drawing Sheets

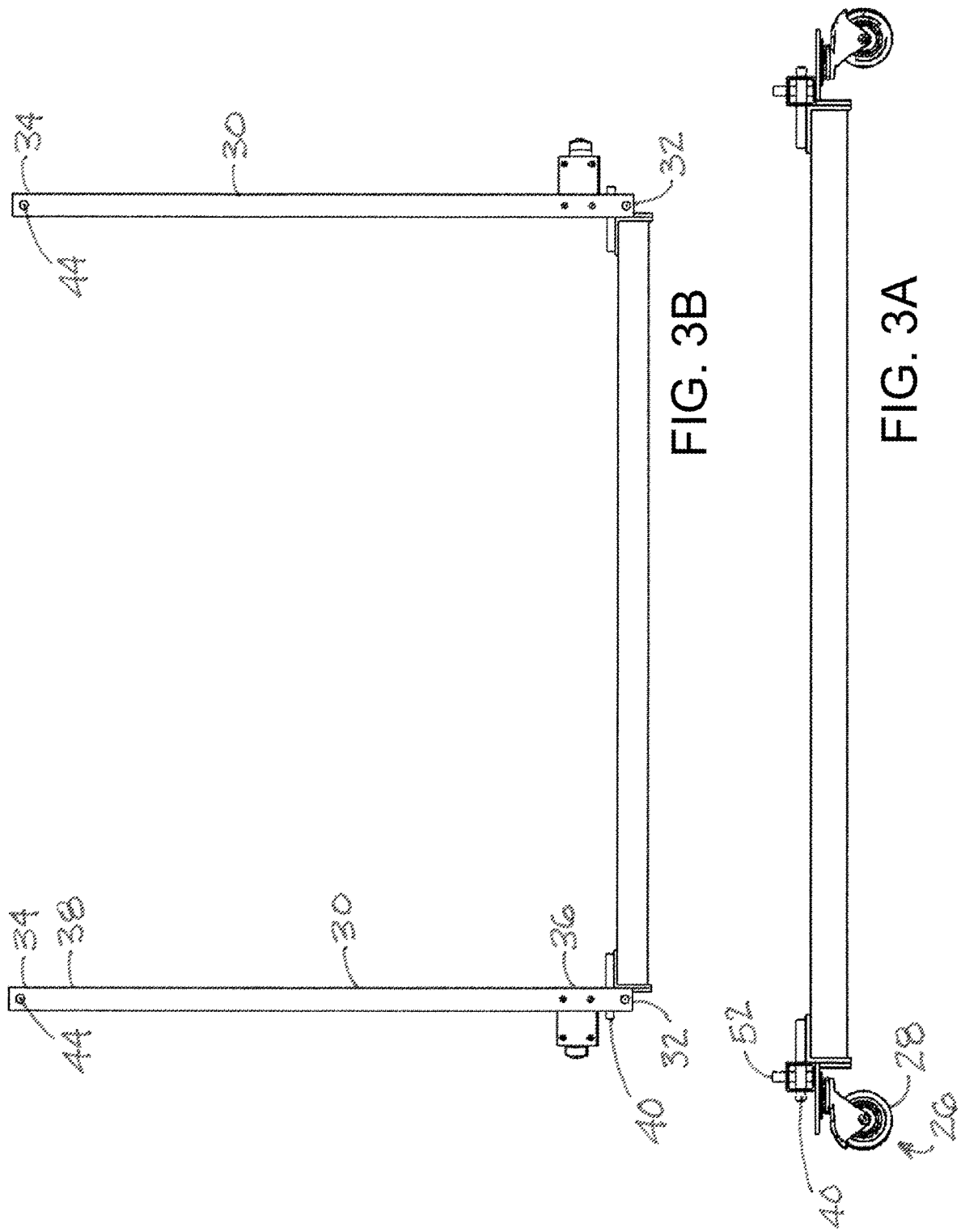

APPARATUS FOR MOVING OBJECTS SUCH AS SMALL RECREATIONAL VEHICLES

BACKGROUND

Field

The present disclosure relates to devices for transporting objects short distances, and more particularly pertains to a new apparatus for moving objects such as small recreational vehicles, particularly in tight spaces where maneuverability is limited.

SUMMARY

In one aspect, the present disclosure relates to an apparatus for moving an object across a ground surface, and the apparatus may comprise a platform having an upper surface for positioning the object on, the platform having a perimeter, and a plurality of lift assemblies configured to selectively raise the platform off of the ground surface and permit the apparatus to move across the ground surface with the object carried on the platform. The plurality of lift assemblies may be located along the perimeter of the platform, and each of the lift assemblies may have a deployed condition and a retracted condition. The deployed condition may be characterized by the lift assembly facilitating movement of the platform across the ground surface.

In some implementations of the disclosure, each of the lift assemblies may be independently movable between the deployed and retracted conditions. The deployed condition may be characterized by the platform being in an elevated position above the ground surface, and the retracted condition may be characterized by the lift assembly resisting movement of the platform across the ground surface. Further, the retracted condition may be characterized by the platform being in a lowered position, and the platform may rest on the ground surface in the lowered position.

In implementations, each lift assembly of the plurality of lift assemblies may be positioned on the perimeter of the platform toward a corner of the platform, and the plurality of lift assemblies may comprise two pairs of lift assemblies, with each of the lift assemblies being positioned along one side portion of the perimeter of the perimeter of the platform.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 3A is a schematic end view of the apparatus, according to an illustrative embodiment, with the lift assemblies shown in the deployed condition.

FIG. 3B is a schematic end view of the apparatus, according to an illustrative embodiment, with the lift assemblies shown in the retracted condition.

DETAILED DESCRIPTION

Figure 1:
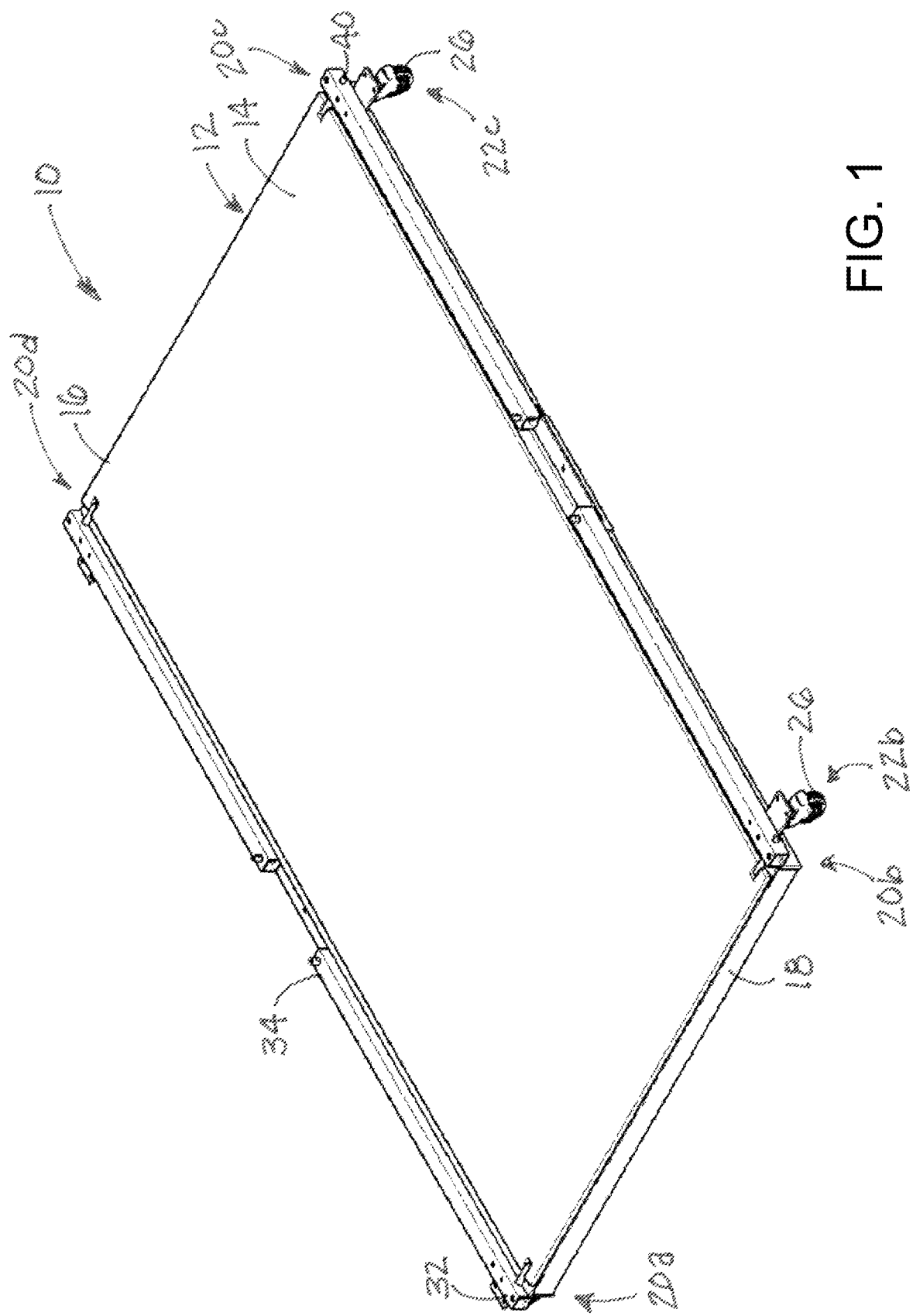
FIG. 1 is a schematic isometric view of a new apparatus for moving objects according to the present disclosure, with the lift assemblies shown in the deployed condition.
Figure 2:
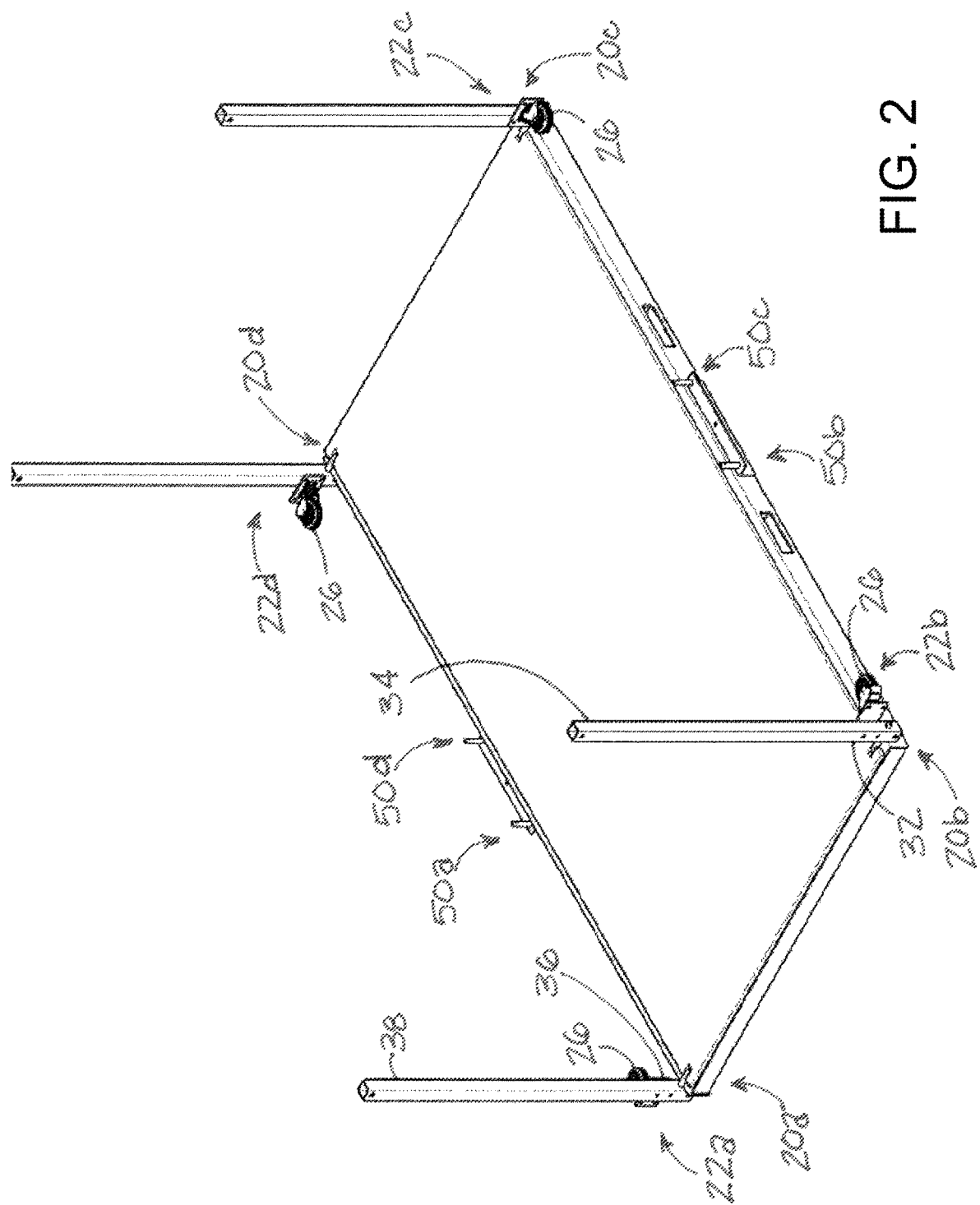
FIG. 2 is a schematic isometric view of the apparatus for moving objects according to the present disclosure, with the lift assemblies shown in the retracted condition.
Figure 4A:
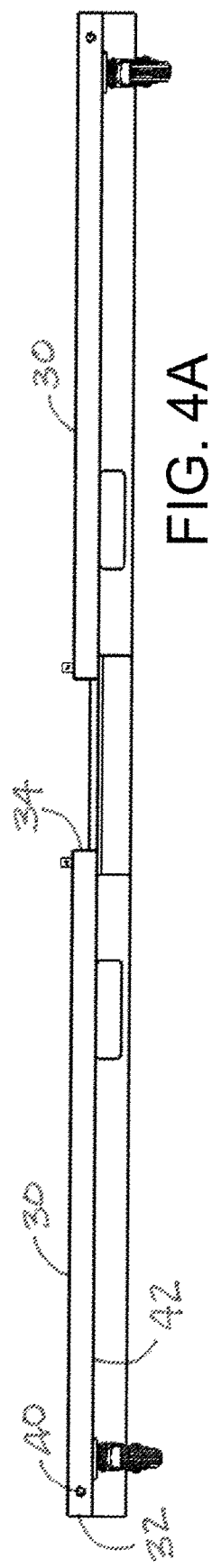
FIG. 4A is a schematic side view of the apparatus, according to an illustrative embodiment, with the lift assemblies shown in the deployed condition.
Figure 4B:
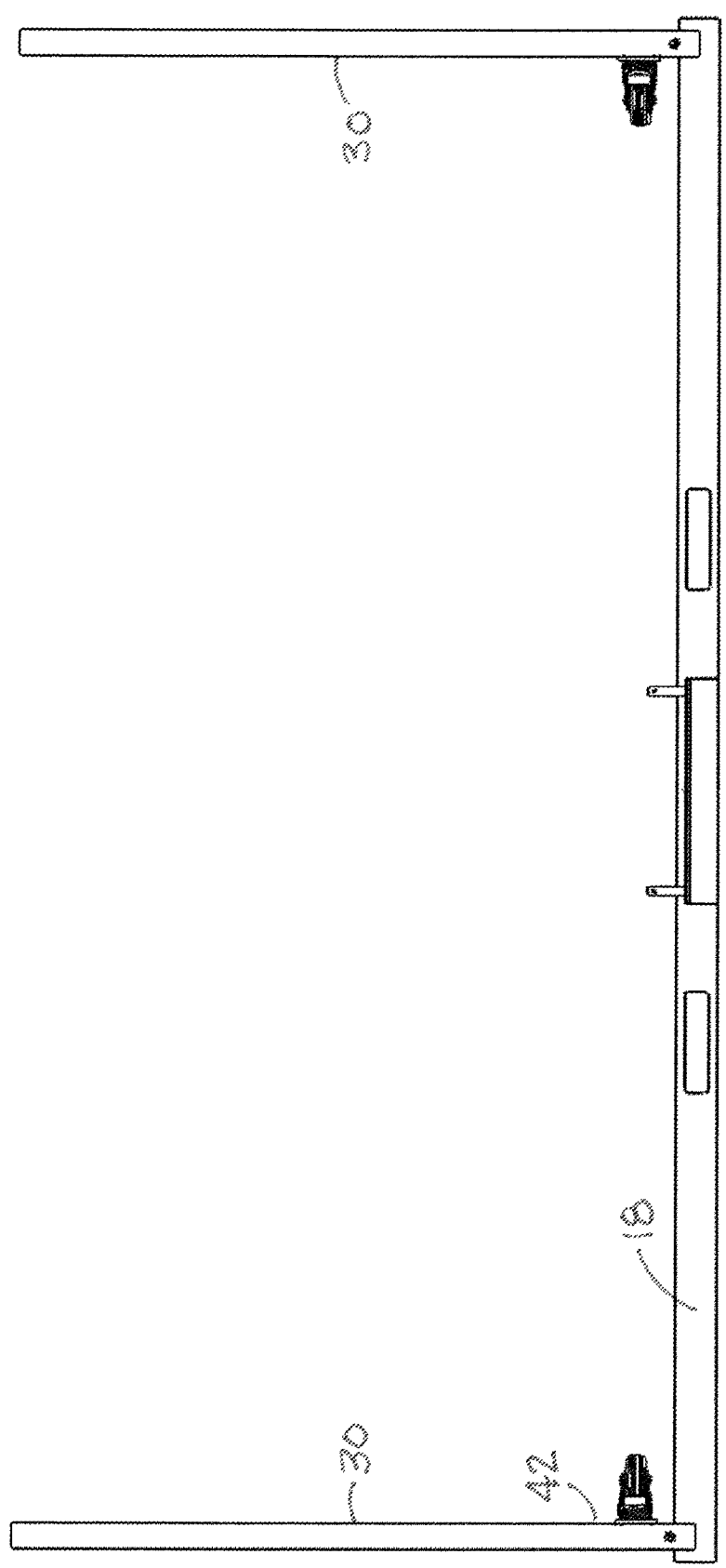
FIG. 4B is a schematic side view of the apparatus, according to an illustrative embodiment, with the lift assemblies shown in the retracted condition.
Figure 5A:
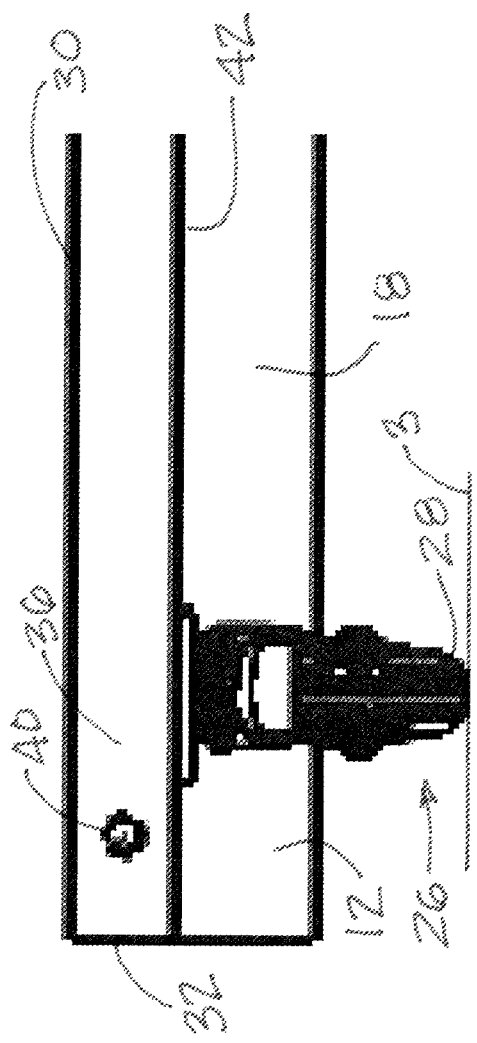
FIG. 5A is a schematic side view of a portion of the apparatus, according to an illustrative embodiment, with the lift assemblies shown in the deployed condition.
Figure 5B:
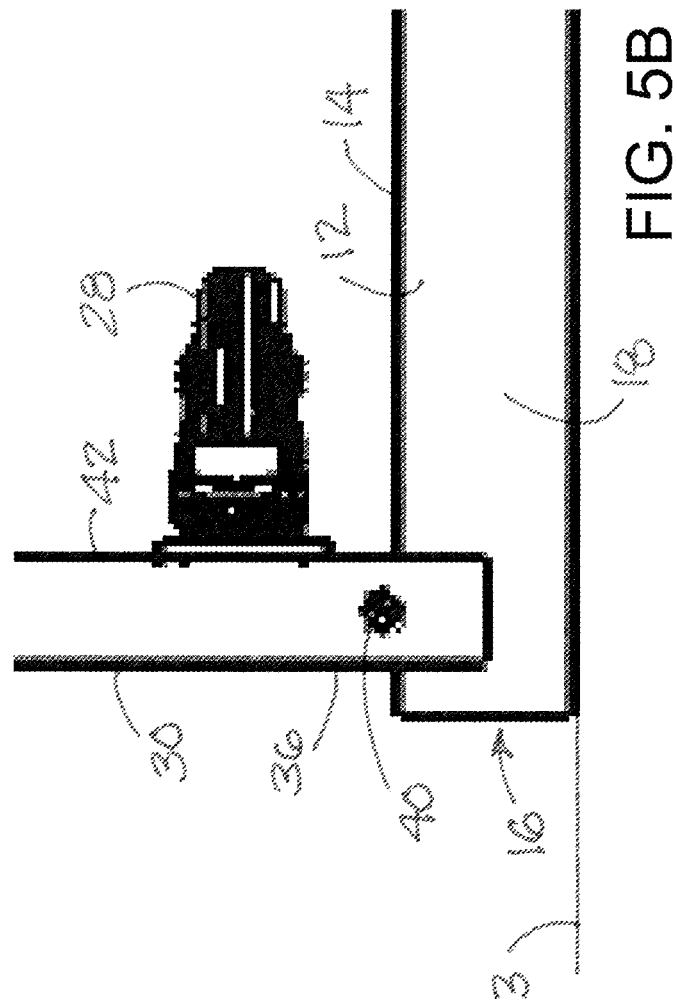
FIG. 5B is a schematic side view of a portion of the apparatus, according to an illustrative embodiment, with the lift assemblies shown in the retracted condition.
Figure 6A:
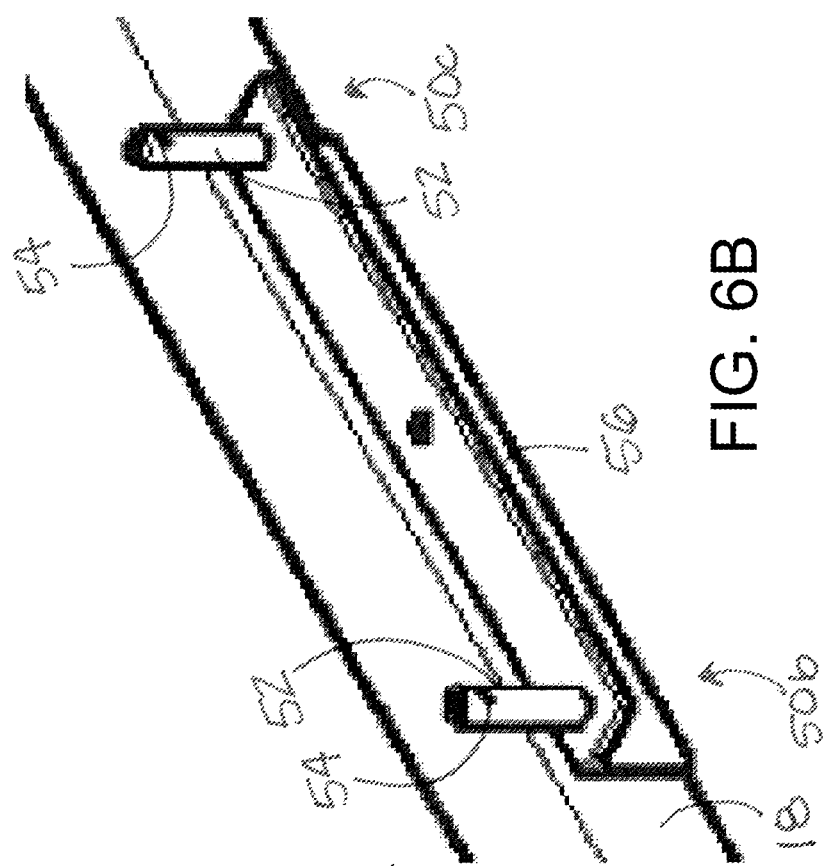
FIG. 6A is a schematic isometric view of a portion of the apparatus, according to an illustrative embodiment, and particularly showing the securing assemblies with the lift assemblies in the deployed condition.
Figure 6B:
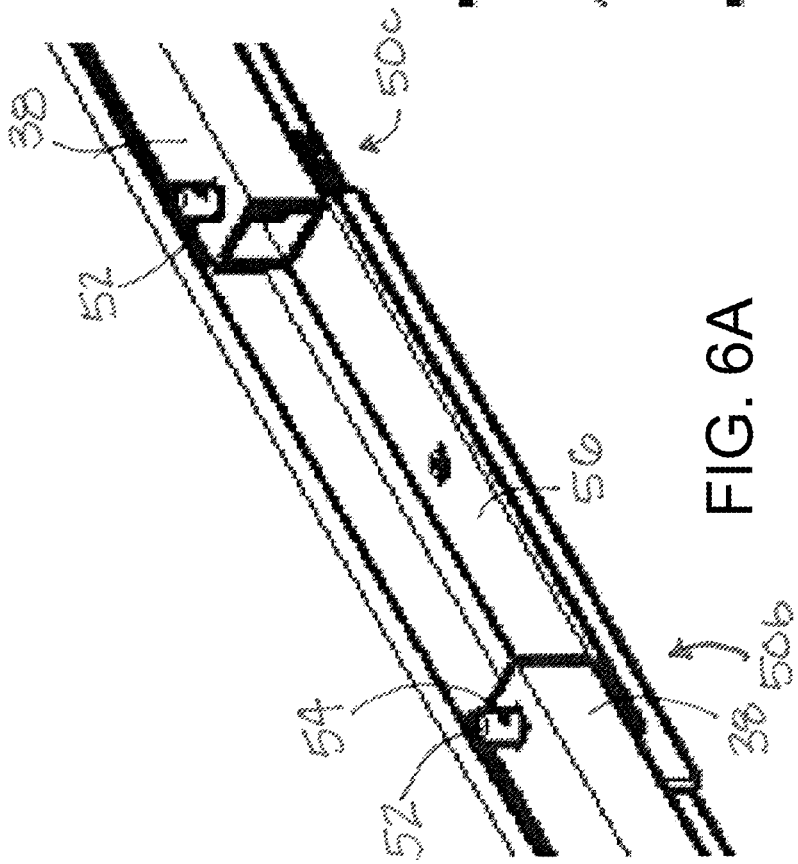
FIG. 6B is a schematic isometric view of a portion of the apparatus, according to an illustrative embodiment, and particularly showing the securing assemblies with the lift assemblies in the retracted condition.

With reference now to the drawings, and in particular to FIGS. 1 through 6 thereof, a new apparatus for moving objects, such as small recreational vehicles, embodying the principles and concepts of the disclosed subject matter will be described.

In one aspect, the disclosure relates to an apparatus 10 for moving an object across a ground surface 2. For the purposes of this description, the object will be described as a recreational vehicle, although potential applications to other types of objects may become readily apparent upon consideration of this disclosure. The vehicle may have a rotating element to move the vehicle across the ground surface, and illustratively the rotating element may comprise a belt, such as in the case of a snowmobile, which may also have a pair of skis or skids. As a further illustration, the rotating element may comprise a wheel, such as in the case of a motorcycle, an all-terrain vehicle (ATV) or other utility vehicle, which may have two or more wheels. It should also be recognized that other, non-recreation related objects may also be suitable for being moved by the apparatus 10, such as, for example, attachments or implements for vehicles (e.g., a loader bucket).

The apparatus 10 may include a platform 12 for positioning the vehicle on during utilization of the apparatus. The platform 12 may have an upper surface 14, which may or may not be continuous and solid in character, but is typically substantially horizontally oriented to provide support for the vehicle. The platform 12 may have a perimeter 16 with a perimeter surface 18 that extends downwardly from the upper surface of the platform. Illustratively, the platform 12 may be formed by a perimeter frame with multiple cross members, and a sheet of material lying on the frame and/or the cross members. In some embodiments, pockets or channels may be formed in the perimeter surface 18 for accepting lifting forks to facilitate lifting the platform using, for example, a fork lift. In some embodiments, the perimeter may have a generally rectangular shape, and may be elongated along one horizontal axis such that the platform has relatively longer side portions of the perimeter 16 and relatively shorter end portions of the perimeter. Illustratively, the platform 12 may have a size of approximately 4 foot wide by 8 foot long, although other suitable sizes may be utilized. The perimeter 16 may have corners which are positioned between the side and end portions of the perimeter. Illustratively, the perimeter may have four corners 20a, 20b, 20c, and 20d.

The apparatus 10 may also include a plurality of lift assemblies 22 for selectively raising the platform 12 off of the ground surface 2. Each of the lift assemblies 22 may be independently movable between the deployed and retracted conditions. In the illustrative embodiments, the plurality of lift assemblies 22 may include four lift assemblies 22a, 22b, 22c, and 22d. Each of the lift assemblies 22 may be characterized by having a deployed condition and a retracted condition. The deployed condition of the lift assemblies 22 may be characterized by the lift assembly being configured to facilitate movement of the platform 12 across the ground surface 2. The retracted condition of the lift assemblies 22 may be characterized by the lift assembly resisting movement of the platform across the ground surface, or at least not facilitating movement of the platform to the degree that movement is assisted in the deployed condition. The deployed condition of the lift assembly may further be characterized by the platform 12 being in an elevated position with respect to the ground surface, and the retracted condition may be characterized by the platform being in a lowered position with respect to the ground surface. As a result, the platform 12 may rest on the ground surface in the lowered position.

In some embodiments, the plurality of lift assemblies 22 may include at least one pair of lift assemblies 22a, 22b, which may be positioned along one of the side sections of the perimeter 16 of the platform. In some embodiments, two pairs of the lift assemblies may be utilized, with each of the lift assemblies being positioned at or adjacent to one of the corners 20a, 20b, 20c, and 20d of the platform, and accordingly the plurality of lift assemblies may comprise four lift assemblies.

Each of the lift assemblies 22 may include a ground contacting element 26 for contacting the ground surface 2. The deployed condition of the lift assemblies may be characterized by the ground contacting element 26 of the respective lift assembly being in contact with the ground surface 2 in a manner that supports at least a portion of the platform 12 in the elevated position above the ground surface. The retracted condition of the lift assembly may be characterized by the ground contacting element of the respective lift assembly being withdrawn from the deployed condition such that the ground contacting element does not support the portion of the platform in the elevated condition above the ground surface, and may also be characterized by the platform being is in the lowered position. The retracted condition may be characterized by the ground contacting element being withdrawn from contact with the ground surface. The ground contacting element 26 may include a rotatable wheel 28 which is rotatable about a substantially horizontal axis, and may also be swivelable with respect to the platform 12 about a substantially vertical axis (e.g., a caster) when in the deployed condition.

Each of the lift assemblies 22 may also include an elongated support arm 30. The support arm 30 may be elongated with an inboard end 32 and an outboard end 34, and an inboard end portion 36 located toward the inboard end and an outboard end portion 38 toward the outboard end. Illustratively, the length of the support arm may be approximately 3 feet to approximately 4 feet, but other lengths may be utilized. The support arm 30 may be mounted on the platform by a pivot 40 which permits pivot movement of the support arm with respect to the platform. The ground contacting element may be mounted on an underside 42 of the support arm such that the element 26 is oriented toward the ground surface. An aperture 44 may be formed in the support arm 30 toward the outboard end 34.

The pivot 40 may be located on the support arm 30 toward the inboard end 32, and the pivot may be located on the platform 12 toward one of the corners of the perimeter of the platform. The ground contacting element 26 may be located toward the inboard end 32 of the support arm, and may be located on the inboard end portion 36. The relative positioning of the ground contacting element 26 and the pivot 40 on the support arm may permit the length of the arm between the element 26 and the outboard end 34 of the arm may function as a lever to multiply the force applied to the outboard end of the arm by the user's hand in pressing the element downwardly against the ground surface. The relationship between the position of the ground contacting element 26 with respect to the position of the pivot 40 the support arm 30 may also tend to bias the lift assembly toward the retracted condition, and away from the deployed condition.

In the deployed condition, the support arm 30 may be pivoted downwardly into a position in which the arm is adjacent to the platform 12 to force the ground contacting element downwardly with respect to the platform such that the ground contacting element protrudes below a bottom or lowest extent of the platform such that the ground contacting element lifts the platform upwardly and off of the ground surface. The support arm 30 may be in a deployed position when the lift assembly is in the deployed condition. The deployed position of the support arm may be characterized by the support arm being substantially horizontally oriented. In the deployed condition, the outboard ends 34 of the support arms 30 of the lift assemblies located adjacent to each other on a side of the platform may be linkable together to help maintain the adjacent lift assemblies in the deployed condition.

In the retracted condition, the support arm 30 may be pivoted upwardly from the position adjacent to the platform characteristic of the deployed condition of the assembly 22 such that the ground contacting element 26 is raised upwardly to permit the platform 12 to move downwardly toward the ground surface 2. The support arm may be in a retracted position in the deployed condition of the lift assembly, and the retracted position may be characterized by the support arm being oriented substantially vertical, or at least shifted from the substantially horizontal orientation of the deployed position.

The apparatus 10 may also include structure for selectively securing one or more of the lifting assemblies in the deployed condition, such as by securing the support arm of the respective lift assembly in the corresponding deployed position. In some embodiments, the apparatus 10 includes at least one securing assembly 50 for selectively securing a respective lift assembly in the deployed condition, and more specifically may secure the support arm of the lift assembly in the deployed position. In some embodiments, the securing assembly 50 may be configured to engage the outboard end 34 of the support arm. In the illustrative embodiments, the securing assembly 50 may engage the outboard ends of adjacent support arms, or support arms on the same side portion of the perimeter of the platform, to fix the positions of the adjacent support arms in the respective deployed positions. A plurality of securing assembly 50a, 50b, 50c, 50d may be utilized with a securing apparatus securing each of the lift assemblies.

The securing assembly 50 may include a securing post 52 for engaging the support arm 30 of one of the lift assemblies when the secured support arm is in the deployed position. The securing post 52 may be insertable into the aperture 44 of the support arm when the support arm is in the deployed position. A clip aperture 54 may be formed in the securing post 52 to receive a securing clip to block movement of the outboard end of the support arm off of the post 52 and out of the deployed position when the securing clip is mounted on the post. The securing assembly 50 may include a post support 56 for supporting the securing post 52. The post support 56 may be mounted on the platform 12. The post support 56 may be located on one side portion of the perimeter of the platform, and the post support may extend along the side portion of the perimeter. In some embodiments, a pair of the securing posts 52 may be mounted on the post support 56.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An apparatus for moving an object across a ground surface, the apparatus comprising:
    a platform having an upper surface for positioning the object on, the platform having a perimeter; and
    a plurality of lift assemblies mounted on the platform, the lift assemblies being located along the perimeter of the platform, each of the lift assemblies comprises:
        an elongated support arm having an inboard end and an outboard end, the support end being pivotally mounted on the platform by a pivot located at the inboard end of the support arm to permit pivot movement of the support arm with respect to the platform;
        a ground contacting element mounted on the support arm at a mount location on the support arm between the pivot at the inboard end and the outboard end of the pivot arm, the mount location being located at a first distance from the pivot at the inboard end and the mount location being located at a second distance from the outboard end; and
        wherein the second distance is greater than the first distance such that the support arm acts as a lever when a downward force is applied to the outboard end of the support arm to push the ground contacting element downwardly and the platform upwardly via the pivot to lift the platform and any object thereon upwardly off of the ground surface;
    wherein each lift assembly has a deployed condition and a retracted condition;
    wherein the deployed condition of a said lift assembly is characterized by the lift assembly supporting the platform in an elevated position off of the ground surface and having the ground contacting element in contact with the ground surface to facilitate movement of the platform across the ground surface; and
    wherein the retracted condition of a said lift assembly is characterized by the lift assembly not supporting the platform in the elevated position off of the ground surface such that the platform is in a lowered position.

2. The apparatus of claim 1 wherein each of the lift assemblies is independently movable between the deployed and retracted conditions.

3. The apparatus of claim 1 wherein the platform has a perimeter with a perimeter surface; and
    the deployed condition of each lift assembly is characterized by the platform being alongside the perimeter surface of the platform and the retracted condition is characterized by a portion of each of the lift assemblies being positioned alongside the perimeter surface of the platform.

4. The apparatus of claim 1 wherein the retracted condition is characterized by the lift assembly resisting movement of the platform across the ground surface.

5. The apparatus of claim 1 wherein the retracted condition is characterized by the ground contacting element of the lift assembly being withdrawn from contact with the ground surface.

6. The apparatus of claim 1 wherein the platform rests on the ground surface in the lowered position.

7. The apparatus of claim 1 wherein each lift assembly of the plurality of lift assemblies is positioned on the perimeter of the platform toward a corner of the platform.

8. The apparatus of claim 1 wherein the plurality of lift assemblies comprises two pairs of lift assemblies, each of the lift assemblies being positioned along one side portion of the perimeter of the perimeter of the platform.

9. The apparatus of claim 1 wherein the perimeter of the platform defines a space over the upper surface of the platform, the retracted condition of the lift assembly is characterized by the ground contacting element of the lift assembly being positioned outside of the space over the upper surface of the platform.

10. The apparatus of claim 1 wherein the perimeter of the platform has a perimeter edge with a substantially rectangular shape comprised of side edge portions, the upper surface of the platform being planar to the side edge portions of the perimeter edge to facilitate movement of a recreational vehicle onto and off of the upper surface of the platform.

11. The apparatus of claim 10 wherein the elongated support arm of each of the lift assemblies is positioned along one of the side edge portions of the perimeter edge of the platform when the lift assembly is in the retracted condition.

12. The apparatus of claim 1 wherein the ground contacting element comprises a rotatable wheel rotatable about a substantially horizontal axis.

13. The apparatus of claim 12 wherein the rotatable wheel is swivelable with respect to the platform about a substantially vertical axis when the lift assembly is in the deployed condition.

14. The apparatus of claim 1 wherein, in the deployed condition, the support arm is pivoted downwardly into a position adjacent to the platform to move the ground contacting element downwardly with respect to the platform such that at least a portion of the ground contacting element protrudes below a plane defined by a bottom of the platform.

15. The apparatus of claim 14 wherein, in the retracted condition, the support arm is pivoted upwardly from the position adjacent to the platform of the deployed condition such that the ground contacting element is raised upwardly to permit the platform to move downwardly toward the ground surface.

16. The apparatus of claim 1 additionally comprising at least one securing assembly for selectively securing the at least one lift assembly in the deployed condition.

17. The apparatus of claim 16 wherein the at least one lift assembly includes a support arm movably mounted on the platform, and
wherein the at least one securing assembly is configured to engage the support arm to selectively secure the support arm in a deployed position.

18. The apparatus of claim 17 wherein the at least one securing assembly comprises a securing post for engaging a support arm of a said lift assembly when the support arm is in the deployed position.

19. An apparatus for moving an object across a ground surface, the apparatus comprising:

a platform having an upper surface for positioning the object on, the platform having a perimeter; and
a plurality of lift assemblies configured to selectively raise the platform off of the ground surface and permit the apparatus to move across the ground surface with the object carried on the platform, the plurality of lift assemblies being located along the perimeter of the platform, each of the lift assemblies having a deployed condition and a retracted condition, the deployed condition being characterized by the lift assembly facilitating movement of the platform across the ground surface;
at least one securing assembly for selectively securing the at least one lift assembly in the deployed condition;
wherein the at least one lift assembly includes a support arm movably mounted on the platform,
wherein the at least one securing assembly is configured to engage the support arm to selectively secure the support arm in a deployed position;
wherein the at least one securing assembly comprises a securing post for engaging a support arm of a said lift assembly when the support arm is in the deployed position; and
wherein the securing post is insertable into an aperture of the support arm when the support arm is in the deployed position.

20. An apparatus for moving an object across a ground surface, the apparatus comprising:

a platform having an upper surface for positioning the object on, the platform having a perimeter; and
a plurality of lift assemblies configured to selectively raise the platform off of the ground surface and permit the apparatus to move across the ground surface with the object carried on the platform, the plurality of lift assemblies being located along the perimeter of the platform, each of the lift assemblies having a deployed condition and a retracted condition, the deployed condition being characterized by the lift assembly facilitating movement of the platform across the ground surface;
wherein each of the lift assemblies additionally comprises a support arm being elongated with an inboard end and an outboard end, the support arm being mounted on the platform by a pivot located toward the inboard end of the support arm and permitting pivot movement of the support arm with respect to the platform;
wherein, in the deployed condition, the support arm is pivoted downwardly into a position adjacent to the platform to force the ground contacting element downwardly with respect to the platform such that the ground contacting element protrudes below a bottom of the platform such that the ground contacting element lifts the platform upwardly and off of the ground surface;
wherein, in the retracted condition, the support arm is pivoted upwardly from the position adjacent to the platform of the deployed condition such that the ground contacting element is raised upwardly to permit the platform to move downwardly toward the ground surface;
wherein the support arm is in a deployed position in the deployed condition of the lift assembly, the deployed position being characterized by the support arm being oriented substantially horizontal; and
wherein the support arm is in a retracted position in the deployed condition of the lift assembly, the retracted position being characterized by the support arm being oriented substantially vertical.

\* \* \* \* \*